Jan. 10, 1956     J. L. RYDE     2,730,143
POWER SAW CHAIN
Filed Feb. 11, 1953
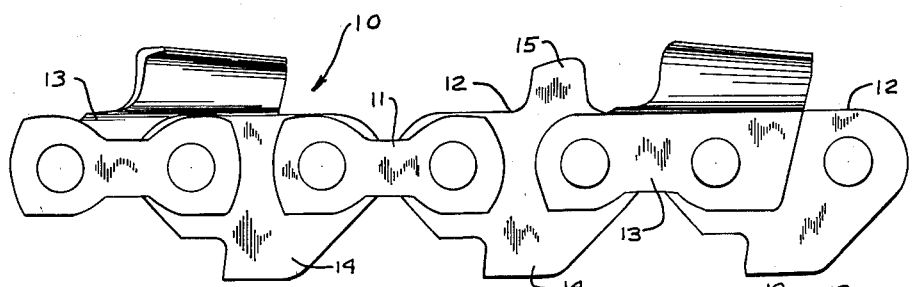
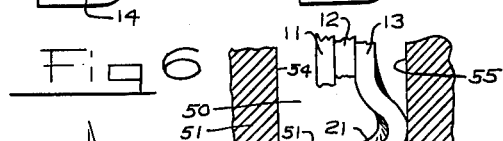
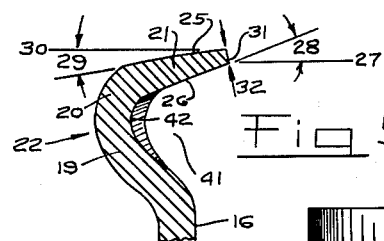
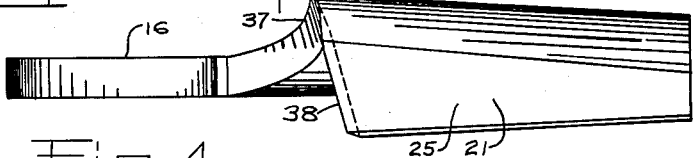
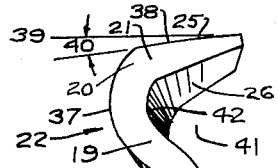
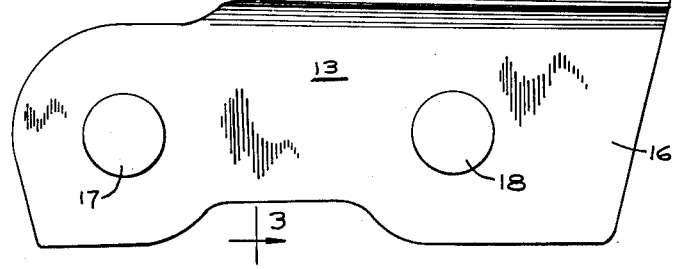
*INVENTOR*
JOHN L. RYDE
BY *William W. Haefliger*

United States Patent Office 2,730,143
Patented Jan. 10, 1956

2,730,143

POWER SAW CHAIN

John L. Ryde, Los Angeles, Calif., assignor to McCulloch Motors Corporation, Los Angeles, Calif., a corporation of Wisconsin Application February 11, 1953, Serial No. 336,310

6 Claims. (Cl. 143—135)

This invention relates to improvements in saw chains for use in cutting wood by means of power driven chain saws, and more particularly to novel cutting tooth configurations providing improved cutting efficiency of saw chains and faster cutting speeds thereof.

It is an object of the invention to provide an improvement in cutter teeth for use in saw chains, the improvement including a novel tapered blade configuration which when used in a cutting operation results in increased cutter tooth stability and maximum clearance for the loosened chips in passing rearwardly by and with respect to the blade and heel portions of the cutter tooth.

It is another object of the invention to provide an improved saw chain cutter tooth including a novel curved heel and tapered blade combination which in a cutting operation provides for minimizing the drag force arising in cutting loose and lifting chips in a cutting operation, and results in a faster cutting tooth and increased cutting efficiency.

It is a further object of the invention to provide an improved cutter tooth for use in saw chains including a novel tapered blade which is inclined upwardly from the heel of the tooth and away from the body of the link to provide for decreased curvature of the shank with concomitant increased shank strength.

It is a further object of the invention to provide an improved saw chain cutter tooth of the type having a blade extending laterally as respects the plane of the tooth, wherein the blade has a taper, the taper being in thickness away from the plane of the tooth to facilitate cutting and lifting of chips.

It is a further object of the invention to provide an improved saw chain cutter tooth having a tapering blade wherein the surfaces of the blade are inclined to the horizontal at selected angles, the angle of the inclination of the under surface being substantially 20°.

In the cutter tooth of this invention the tooth has a blade which extends laterally over the body of the tooth. At the forward end of the blade is a cutting edge which inclines rearwardly at an angle known as the sharpening angle. The blade has a geometrical configuration including that it has a rearward slant away from the bottom of the kerf which is cut, to provide clearance, the angle of this slant being known as a back rake angle. In this invention the angle of the cutting edge relative to a normal to the plane of the body of the tooth is related to the sharpening angle, the back rake angle and the angle of slant to the horizontal of the outer face of the blade. It is an object of the invention to provide a formula involving these angles to provide for angles giving an optimum design, and particularly to result in desired optimum angle for the cutting edge. In a preferred form of the invention the relation between these angles is such that the cutting edge is disposed in a plane normal to the plane of the body of the tooth, and it is an object of the invention to provide this relationship.

These and other objects and advantages of the invention may be brought out in the following part of the specification wherein forms of the invention have been explained in detail for the purpose of completeness of disclosure, and not for limiting the scope of the invention which is defined in the appended claims.

Referring to the drawings which are for illustrative purposes only;

Fig. 1 is an elevational view of a saw chain embodying a succession of chain links, some of which have cutter teeth of the present invention formed thereon;

Fig. 2 is an enlarged view of one form of the cutter links of the present invention;

Fig. 3 is a frontal view of the link illustrated in Fig. 2, taken along line 3—3 thereof;

Fig. 4 is a top view of the cutter link illustrated in Fig. 2;

Fig. 5 is a cross-sectional view of the cutter tooth illustrated in Fig. 2 and taken along line 5—5 thereof; and Fig. 6 is an end view of a kerf being cut by the cutter tooth of the present invention.

Referring now to Fig. 1, there is illustrated a short section 10 of saw chain adapted to be used on a power driven chain saw and to be driven by the driving sprocket thereof. The chain comprises a succession of links pivotally connected in end to end relation so as to be flexible in the plane of a saw bar, not shown, around which the chain is driven. The links comprise connecting links or side links 11, spacer links 12, and alternate left and right hand cutter links 13. The latter are connected to the chain as side links in the embodiment shown; however, since the invention resides in the construction of the cutter tooth portion of the cutting link, the invention is not limited to a cutter link connected to the chain as a side link, but may be applied to a cutter link connected to the chain between opposite side links. Each spacer link has a wing 14 integrally formed on the lower portion thereof, the wing being adapted to be guided in a groove in the saw bar and to be engaged by the driving sprocket of the chain saw, this function being well known in the art. The spacer link immediately preceding each cutter link also has integrally formed thereon a depth gauge 15 projecting upwardly to limit the depth of cut of the cutting link 13 in a kerf being cut by the saw chain. The depth gauge may alternately be formed on the cutter link itself, forwardly of the cutter tooth.

The cutter link 13 is illustrated in greater detail in Figs. 2, 3, 4, and 5, showing elevational, frontal, top, and sectional views of the link. The link includes a vertical body portion 16 having two rivet holes 17 and 18 spaced longitudinally therein. A curved heel portion 19 is integrally formed on the body portion and curves outwardly to one side of the link and upwardly from the body portion. Joined to the upper portion 20 of heel 19 is a tapered blade portion 21 which extends inwardly in a transverse direction toward the vertical plane of the body portion 16 of the cutter link 13 and also upwardly from the body portion so as to be inclined at an upward angle from a line perpendicular to the vertical body portion, as seen in Fig. 5. The heel 19 and tapered blade portion 21 together form the cutter tooth 22.

The tapered blade portion of the cutter link includes an upper or external surface 25 and a lower or internal surface 26 which converge toward one another in the generally transverse direction. In Fig. 5 these two surfaces appear as lines 25 and 26, and it is apparent that the internal surface 26 is inclined upwardly from the horizontal line 27 at an angle 28 which is greater than the upward angle of inclination 29 of the external surface 25 from horizontal line 30. As shown in Fig. 5 the angle 28 is 20°, this angle being a particularly preferred design angle both from the standpoint of structural considerations of the tooth and of operating efficiency; that is, it enables the blade of the tooth to have the proper amount of strength immediately over the body portion 16, but still there is maximum clearance for the flow and removal of chips. The angle 28 may be varied within a few degrees. The angle 29 is selected in a manner as will be described hereinafter in relation to other angles to arrive at an optimum angle of the cutting edge of the blade relative to normal to the body of the tooth, this being the angle 40 in Fig. 3 as will be referred to presently. It is also apparent from Figs. 4 and 5 that the external surface 25 of blade portion 21 is almost flat, there being only a slight degree of curvature given to surface 25. As a result of the convergence of surfaces 25 and 26, the innermost end or extremity 31 of blade portion 21 has a width 32 considerably less in magnitude than the thickness 33 of body portion 16 of the cutter link. Blade portion 21 is inclined downwardly toward the rear of the cutter link by an angular amount 34, termed "back rake" in the saw chain art. The external surface 25 of blade portion 21 may be flattened by grinding, or milling, or swaging, or by other processes. The convergence of external and internal surfaces 25 and 26 may be accomplished during flattening of external surface 25 or may alternatively be accomplished by grinding or swaging a portion of the internal or lower surface 26. As to the initial process of making the cutter link, it may be formed as a flat blank or body, and then bent to form the curved heel portion and blade extending laterally or transversely with respect to the plane of the blank or body.

The heel and blade portions of the cutter link are sharpened for cutting wood by means of a cylindrical file, at a sharpening angle 35 which is measured toward the rear of the cutter link from a line 36 which is perpendicular to the link body. The sharpened elements of the cutter tooth include a curved chisel edge 37 provided at the forward edge of heel 19, and a transverse chisel edge 38 provided at the forward terminus of tapered blade 21. As seen in Fig. 3, chisel edge 38 is inclined upwardly with respect to horizontal line 39 at an angle 40 measured downwardly from line 39. While the chisel edge 38 slants upwardly from the horizontal in Fig. 3 at an angle 40, the slant at this particular angle represents only one form or species of the invention as will appear hereinafter, by reason of the relationship from which this angle is determined. It is included within applicant's invention that the chisel edge 38 be inclined as shown in Fig. 3, or that it be disposed in a plane normal to the plane of the body 16 of the tooth, as will appear hereinafter. Angle 40 is smaller than angle 29 in Fig. 5 due to the downward and rearward slope of top surface 25 at back rake angle 34. The angular inclination 40 of chisel edge 38 from the horizontal is related to the back rake angle 34, the sharpening angle 35, and the angular inclination 29 of top surface 25 of blade portion 21 from the horizontal by the following trigonometric relation:

$$\tan(\text{angle } 40) = \tan(\text{angle } 29) - \tan(\text{angle } 35)\tan(\text{angle } 34)$$

When angle 40 lies within 10 degrees of horizontal, then tan (angle 40) lies between plus .1763 and minus .1763, and angles 29, 34 and 35 must then have values related as given by the foregoing relation to equal a numerical amount between plus .1763 and minus .1763.

The significance of the foregoing relationship is that it is desired in the design of the tooth to have the various angles involved so related that the angle 40 of the chisel edge is of a particular desired magnitude. The chisel edge may be disposed to lie in a plane normal to the body of the tooth 16 in which case the angle 40 is zero; that is, in designing a tooth one might first select a sharpening angle, that is, the angle 35, an exemplary value for which may be 35°. An exemplary value for the back rake angle 34 is 5°. By selecting the values of these angles and that of the angle 29, the angle 40 can be made such that the chisel edge 38 is disposed in a plane normal to the body of the tooth or inclined slightly toward or away from the plane of the tooth body. It can be readily observed from Figure 4 that varying the magnitude of the sharpening angle effects the angle 40. In a preferred form of the invention, the chisel edge 38 is horizontal, that is, disposed in a plane normal to the body 16 of the tooth. With this configuration, the cutting edge of the tooth slices the fibers at the bottom of the kerf, but does not have to cut through them transversely to the grain. The other factors in the design, as explained, contribute to the end that the fibers do not have to be bent as much in being lifted, and additional clearance is provided for allowing the chips to flow backwardly along the tooth.

In a wood cutting operation, the left and right cutter teeth cut a kerf 50 in the wood 51 as shown in Fig. 6. The bottom 52 of the kerf formed by the cutter teeth of the present invention is in the form of a shallow V due to the inclination 40 of the blade cutting edge 38 away from the body 16 of the cutting link. The apex 53 of the V-shaped form of the kerf bottom is approximately centered between opposite walls 54 and 55 of the kerf 50.

When a cutter tooth is constructed with a tapered blade portion 21 as heretofore described, it is found that the drag force or cutting resistance force to be overcome in a cutting operation is considerably reduced, and that the flow of chips in a rearward direction with respect to the shank and toe is quickened, which amounts to a faster and more efficient cutting operation. The decreased drag is due in part to the tapered blade shape which in a cutting operation slices underneath and lifts the chips with considerably less effort than is necessary to expend in cutting with a cutting tooth having a full-thickness blade. In addition, the tapered blade of the present invention combines the advantages of chain stability, resulting from the use of a flattened external blade surface 25, with the advantages of a larger chip clearance area 41, which is provided for by the increased angular inclination 28 of internal or lower surface 26 of blade portion 21 above the horizontal in converging toward upper surface 25. By increased angular inclination 28 is meant increase over what the angular inclination would be for a nontapered blade portion. Also, the internal curvature 42 of heel 19 is enabled to be considerably reduced, for the same cutter tooth height, when internal surface 26 of blade portion 21 is inclined upwardly toward surface 25, thereby providing for increased heel strength.

From the foregoing it will be observed that by the improvements in construction as described, the gains in operating efficiency and effectiveness set forth, are realized. The disclosure is representative of a preferred form of the invention but is susceptible of various modifications and alternatives within the spirit and scope of the invention as defined in the following claims.

I claim:

1. In a saw chain: a succession of pivotally joined links, certain of said links having cutter teeth formed thereon to define cutter links, certain of said links having depth gauge means extending outwardly therefrom to limit the depth of cut of said cutter teeth; said cutter links being disposed along said chain in alternate left and right configuration; each of said cutter teeth having a tapered blade portion extending transversely of the plane of the cutter link, said tapered blade portion including an internal surface portion and a substantially flat external surface portion converging continuously toward said internal surface portion; said external surface portion being inclined outwardly at an angle from a normal to the plane of the cutter link and being provided with a forward cutting edge inclined rearwardly with respect to a perpendicular to the plane of said cutter link, whereby said alternate left and right cutter teeth define a groove in an object being cut during a cutting operation.

2. In a cutting link for use in a saw chain: means forming a plate having a portion lying in a plane, said plate including a cutter tooth extending upwardly therefrom comprising a blade portion and an intermediate portion, the intermediate portion extending upwardly and curving laterally outwardly with respect to the plane portion of the plate, the blade portion extending laterally across the plane of the plate from the upper end of the intermediate portion, the blade portion tapering in thickness away from the intermediate portion towards its lateral extremity and having the outer surface thereof inclined outwardly at an angle from a normal to the plane portion of said plate, the blade portion and intermediate portion having a beveled cutting edge formed at the leading edge thereof, the cutting edge of the blade portion being inclined rearwardly with respect to the blade portion and disposed in a plane substantially perpendicular to the plane portion of said plate, and the blade portion being inclined from its leading edge toward the plane portion of the plate.

3. In a cutting link for use in a saw chain: means forming a plate having a portion lying in a plane, said plate including a cutter tooth extending upwardly therefrom comprising a blade portion and an intermediate portion, the intermediate portion extending upwardly and curving laterally outwardly with respect to the plane portion of the plate, the blade portion extending laterally across the plane of the plate from the upper end of the curved intermediate portion, the blade portion tapering in thickness away from the intermediate portion towards its lateral extremity, the blade portion and intermediate portion having a beveled cutting edge formed at the leading edge thereof, the cutting edge of the blade portion being inclined rearwardly with respect to the blade portion, the outer face of the blade portion being inclined at an angle outwardly from a normal to the plane of the plate portion and the blade portion also having a slant from its leading edge downwardly towards the plane portion to its rear edge.

4. In a cutting link for use in a saw chain: means forming a plate having a portion lying in a plane, said plate including a cutter tooth extending upwardly therefrom comprising a blade portion and an intermediate portion, the intermediate portion extending upwardly and curving laterally outwardly with respect to the plane portion of the plate, the blade portion extending laterally across the plane of the plate from the upper end of the intermediate portion, the blade portion tapering in thickness away from its junction with the intermediate portion towards its lateral extremity, the blade portion and the intermediate portion having a beveled cutting edge formed at the leading edge thereof, the cutting edge of the blade portion being disposed in a plane normal to the plane of said plate portion and inclined rearwardly with respect to the plane of said plate portion, the outer face of the blade portion being inclined at an angle outwardly from a normal to the plane of the plate portion, the inner face of the blade portion being inclined outwardly from a normal to the plate portion at a larger angle; and the blade portion having a slant rearwardly from its leading edge forming a back rake angle.

5. In a cutting link for use in a saw chain: means forming a plate having a portion lying in a plane, said plate including a cutter tooth extending upwardly therefrom comprising a blade portion and an intermediate portion, the intermediate portion extending upwardly and curving laterally outwardly with respect to the plane portion of the plate, the blade portion extending laterally across the plane of the plate from the upper end of the intermediate portion, said blade portion having an inner face inclined outwardly with respect to a normal to the plane of the plate and forming a continuation of the inner face of the intermediate portion, said blade portion having a substantially flat outer face intercepting the curved outer face of the intermediate portion and converging toward the inner face of said blade portion to provide a taper for said blade portion with said outer face being inclined outwardly at an angle from a normal to the plane portion of said plate, said blade portion and intermediate portion having a beveled cutting edge formed at the leading edge thereof with the edge of the blade portion inclined rearwardly with respect to the blade portion.

6. In a saw chain: a succession of pivotally joined links, certain of said links having cutter teeth formed thereon to define cutter links, certain of said links having depth gauge means extending outwardly therefrom to limit the depth of cut of said cutter teeth; said cutter links being disposed along said chain in alternate right and left configurations; each of said cutter teeth having a tapered blade portion extending transversely of the plane of the cutter link, said tapered blade portion including an internal surface portion and a substantially flat external surface portion converging continuously toward said internal surface portion; said external surface portion being inclined outwardly at an angle from a normal to a plane of the cutter link and being provided with a forward cutting edge inclined rearwardly with respect to a perpendicular to the plane of said cutter link and disposed in a plane substantially normal to the plane of said cutter link, said blade portion having a slant rearwardly from its leading cutting edge forming a back rake angle, whereby said alternate right and left cutter teeth define a groove in an object being cut during a cutting operation.

References Cited in the file of this patent

FOREIGN PATENTS

| | | |
|---|---|---|
| 1,565,052 | Bowman | Dec. 8, 1925 |
| 2,040,852 | Joy | May 19, 1936 |
| 2,508,784 | Cox | May 23, 1950 |
| 2,515,550 | Ciba | July 18, 1950 |
| 2,558,678 | Garrett | June 26, 1951 |
| 2,589,015 | Merz | Mar. 11, 1952 |
| 2,589,914 | Wolf | Mar. 18, 1952 |
| 2,622,633 | Cox | Dec. 23, 1952 |
| 2,652,076 | Bye | Sept. 15, 1953 |